(12) United States Patent
Bell et al.

(10) Patent No.: US 6,424,323 B2
(45) Date of Patent: Jul. 23, 2002

(54) ELECTRONIC DEVICE HAVING A DISPLAY

(75) Inventors: David A. Bell, London; Paul R. Simons, Redhill; Nigel J. Byrnes, Reigate, all of (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/819,285

(22) Filed: Mar. 28, 2001

(30) Foreign Application Priority Data

Mar. 31, 2000 (GB) .............................................. 0007863

(51) Int. Cl.⁷ ................................................. G09G 5/00
(52) U.S. Cl. ............................................. 345/9; 103/87
(58) Field of Search ................................ 345/1, 2, 7, 9, 345/169, 158, 901, 87, 1.1, 4, 5, 6, 2.1, 103, 100; 359/463; 349/59

(56) References Cited

U.S. PATENT DOCUMENTS

| 4,541,727 A | 9/1985 | Rosenthal ................... 350/167 |
| 4,542,958 A | 9/1985 | Young .......................... 350/167 |
| 5,508,720 A * | 4/1996 | DiSanto et al. ............. 345/169 |
| 6,069,593 A * | 5/2000 | Lebby et al. .................. 345/1 |
| 6,320,567 B1 * | 11/2001 | Hirakata et al. ............ 345/100 |

FOREIGN PATENT DOCUMENTS

| EP | 0590498 A1 | 4/1994 | .......... G03B/35/00 |
| EP | 0791847 A1 | 8/1997 | .......... H04N/13/00 |
| WO | WO9747142 | 12/1997 | .......... H04N/13/00 |
| WO | WO9827516 | 6/1998 | .......... H04N/13/00 |

* cited by examiner

*Primary Examiner*—Bipin Shalwala
*Assistant Examiner*—Mansour M. Said
(74) *Attorney, Agent, or Firm*—Jack D. Slobod

(57) ABSTRACT

An electronic device, such as a portable telephone or PDA, has a display in the form of a pixel display with an image deflection system overlying the display. The display is controlled to provide at least two independent display images which, when displayed through the image deflection system, are individually visible from different viewing positions relative to the screen. Suitably, the image deflection system comprises a lenticular screen with the lenticles extending horizontally or vertically across the display such that the different views may be seen through tilting of the device.

10 Claims, 3 Drawing Sheets

ELECTRONIC DEVICE HAVING A DISPLAY

BACKGROUND OF THE INVENTION

1. Field of the Invention

The present invention generally relates to an electronic device having a display. The present invention specifically related to a display for providing multiple images.

2. Description of the Related Art

Electronic devices (such as portable telephones, electronic organisers or personal digital assistants—PDA's) are becoming increasingly complex, and it is now routine for such devices to use: a pixel display to display information to the user of the device. Indeed, the user interface for such devices offers an increasing number of options to the user, but of course the amount of information which can be displayed on the small display screen of a hand-held device is limited.

Although screen resolution is improving rapidly, the limited area available for the screen will always provide a limitation to the amount of information which can be simply displayed in small hand-held or portable devices such as mobile telephones. Larger amounts of data may be made available through the use of nested menus and tree-structured data storage arrangements, but with a small display available, the user may be faced with a requirement to repeatedly select from the limited available displayed options and wait while the next navigation level of the interface is accessed in order to access even relatively close branches of a data tree.

SUMMARY OF THE INVENTION

It is an object of the present invention to provide an improved electronic device that overcomes the shortcomings of the prior art.

According to the present invention, there is provided an electronic device having a display and an image deflection system overlying the display, wherein the display is controlled to provide at least two independent display images which, when displayed through the image deflection system, are individually visible from different viewing positions relative to the display.

Owing to the invention, it is possible to provide a device that can present a greater volume of useful data for a given display size.

The electronic device of the invention has an image deflection system overlying the display so that the device can provide multiple views to the user, each view being visible from different viewing positions.

The use of lenticular screens over display devices is well known for providing autostereoscopic images to the user, and the deflection system may comprise a lenticular screen. In autostereoscopic devices, the lenticular screen provides viewing positions for different images which are spaced by a distance corresponding to the separation of human eyes. In this way, different images are directed to the left and right eyes of the user so as to generate the perception of a stereo image without requiring the user to wear, for example, spectacles having different coloured lenses.

To generate stereo images, the lenticles of the lenticular screen extend from the top to bottom of the screen so that a lateral shift of the viewing position relative to the screen results in different images being visible.

The lenticles in the image deflection system of the present invention may extend across the display so that different images are visible as a function of the angle of inclination of the viewer with respect to the screen. In this way, a user may view the different images by tilting the device about a horizontal axis.

Each lenticle may be associated with three or more display images. For example, a first main image may be provided at a natural position of the device with respect to the user. Tilting the device one way may result in an image being displayed which represents the previous screen of the user interface display. Tilting the device in the other direction may provide explanation regarding the options presented to the user at that time.

The display preferably comprises a pixel display, for example a liquid crystal display, and the device may be a mobile telephone or television, although other options will become apparent to the skilled reader on reading the following description of preferred embodiments.

BRIEF DESCRIPTION OF THE DRAWINGS

Embodiments will now be described, by way of example only, with reference to and as shown in the accompanying drawings, in which.

DETAILED DESCRIPTION OF THE INVENTION

Figure 1:
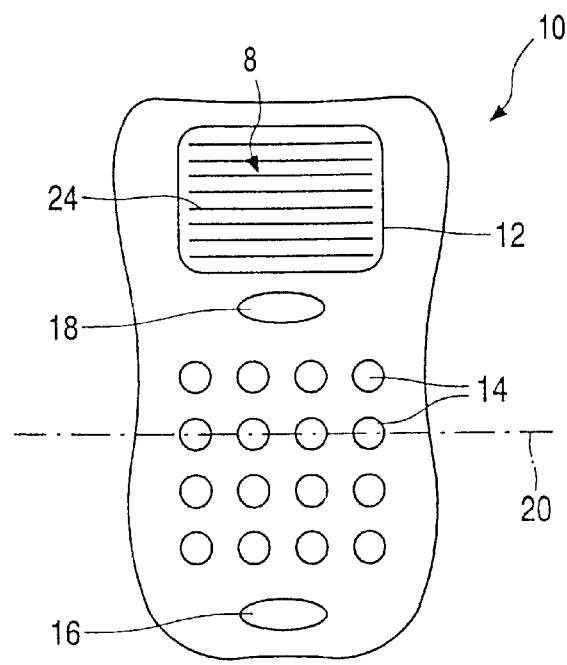
FIG. 1 schematically represents a mobile telephone.

FIG. 1 shows a mobile telephone 10 having a display 12 and a number of input buttons 14 as well as a microphone 16 and a speaker 18. The display 12 comprises a pixel display, in the form of a liquid crystal display, over which is provided an image deflection system in the form of a lenticular screen 8 of the type which has previously been used in the creation of autostereoscopic LCD displays. A display device of this type for use as an autostereoscopic display is described in detail in the commonly assigned EP-A-0 791 847, the disclosure of which the entirety is incorporated herein by way of reference.

The display 12 is controlled to provide at least two independent display images which, when displayed through the lenticular screen 8, are individually visible from different viewing positions relative to the screen 8.

In conventional autostereoscopic lenticular screen display devices, the lenticles extend from top to bottom of the screen so that different images are projected by the lenticular screen to different lateral positions of the user with respect to the screen. The present invention is applicable with this horizontal separation of views although, as will be described below, vertical view separation (through use of horizontally extending lenticles) is equally possible.

As shown schematically in FIG. 1, a plurality of lenticles 24 of the screen 8 overlying the display 12 extend across the display 12, so that the multiple display images are visible at different elevations with respect to the screen 8. Furthermore, horizontal alignment of the lenticles 24 results in the same image being displayed to the left and right eyes of the user. Thus, the two or more images may be viewed by tilting the mobile telephone 10 about a horizontal axis 20.

Figure 2C:
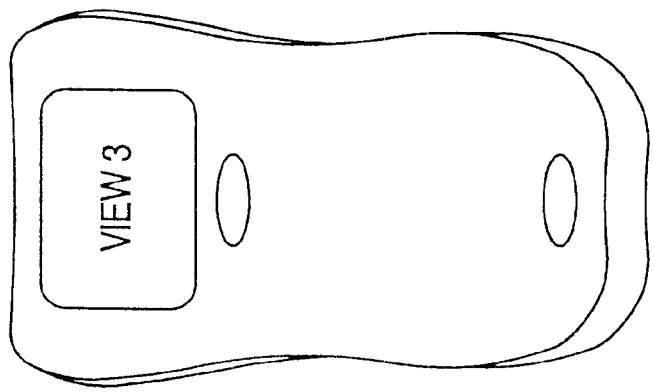
FIGS. 2A–2C show how different images may be viewed from the screen of the telephone of FIG. 1.
Figure 2A:
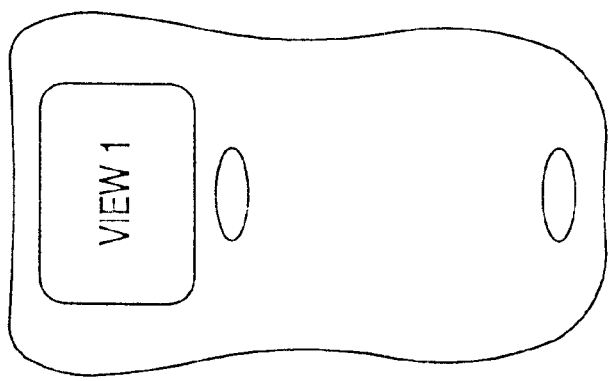
Figure 2B:
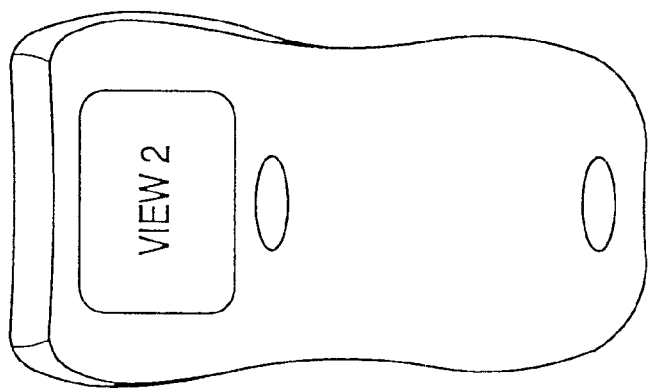

FIGS. 2A–2C show how a mobile telephone 10 (FIG. 1) may be tilted about a horizontal axis 20 (FIG. 1). FIG. 2A shows a normal viewing position of the mobile telephone 10 in which the user views the screen 8 (FIG. 1) from a location substantially normal to the plane of the screen 8. In this position a menu of input options may be displayed to the user, although in FIG. 2A the display image is indicated simply as "View 1".

In order to view a second image, the top of the phone may be tilted towards the user, as represented in FIG. 2B. The image displayed is represented as "View 2", and this may, for example, provide a view of the previous screen so that the user is able to recollect the path of options he has followed during the previous input of data to the mobile telephone 10. A third image, represented in FIG. 2C as "View 3" may be obtained by tilting the mobile telephone 10 in an opposite direction. View 3 may, for example, provide help information about View 1.

The use of multiple independent display images enables the small screen 8 to provide additional information to the user, without the need to press any buttons, thereby improving the clarity of the user interface.

There are various additional ways in which the multiple images may be used. For example, for a quiz game, a question may be displayed as one image, and the answer may be displayed as another image. For example, with applications accessed from the Internet, the information obtained from the Internet may provide specific control as to which data is to be displayed as each possible image.

Figure 3:
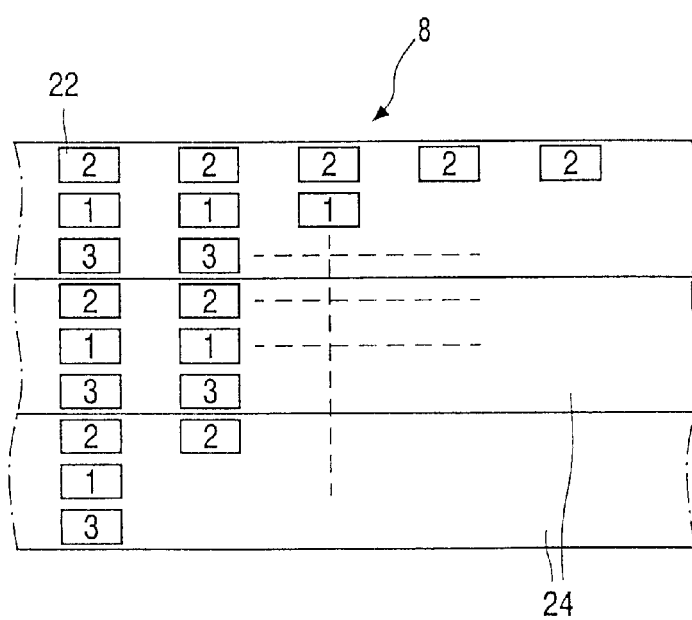
FIG. 3 is illustrative of output addressing for a display in the telephone of FIGS. 1 and 2 giving rise to multiple images.

FIG. 3 shows in greater detail how the pixel display 12 is addressed to provide the multiple views. Each pixel 22 is represented as a square in FIG. 3, although each display position may comprise a triplet of pixels for a colour display. Each lenticle 24 overlies three rows of pixels 22 and all pixels having the same relative position with respect to a lenticle 24 will be visible to a user at the same time. Thus, in FIG. 3, the central row of pixels 22 labeled as "1" may together form View 1, the top row of pixels 22 with respect to each lenticle 24 that are labeled as "2" may provide View 2 and the bottom row of pixels 22 with respect to each lenticle 24 that are labeled as "3" may provide View 3, as illustrated.

Although the embodiment has been described specifically in relation to a mobile telephone, it can be applied to other hand-held or portable devices, such as remote controls, calculators, wrist watches, PDA devices, pagers and multi-function watches.

The display 12 may comprise an active matrix LCD device, although passive LCD displays or other types of display, such as polymer LED displays, may be used.

Figure 4:
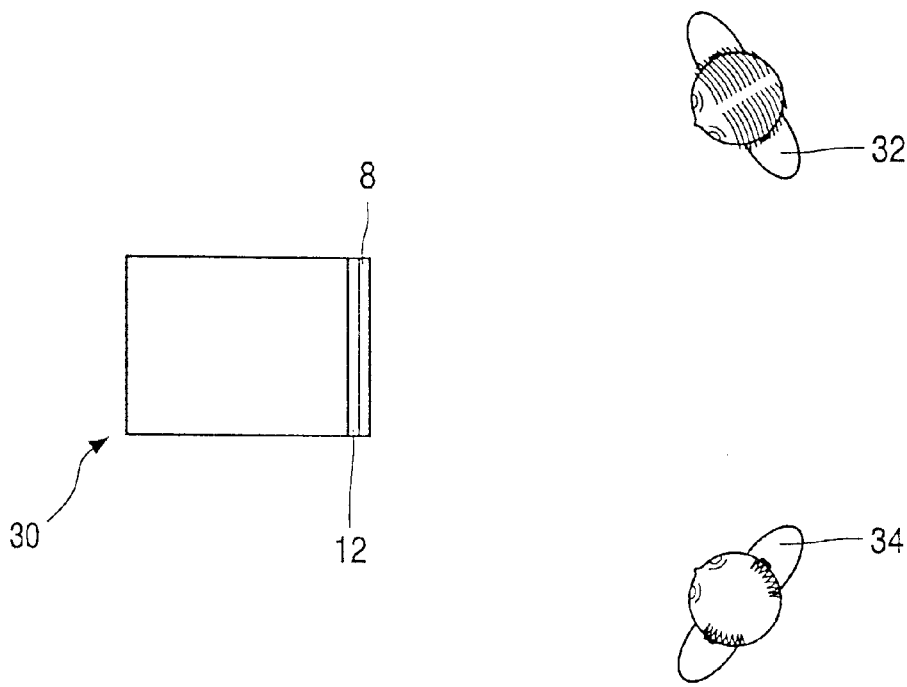
FIG. 4 is a schematic plan view of a television being viewed by two people.
Figure 5:
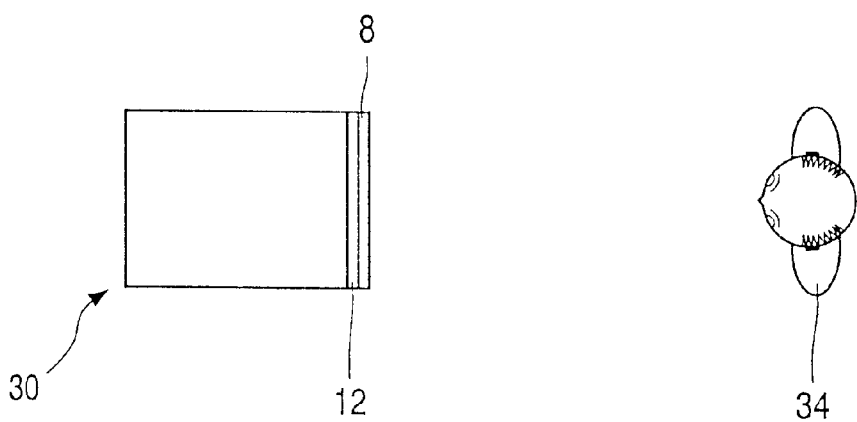
FIG. 5 is a schematic plan view of a television being viewed by a single person.

FIGS. 4 and 5 show a second embodiment in which a television 30 is provided with a display 31 and an image deflection system in the form of a lenticular screen 32 overlying the display 31. The lenticles of the screen 32 are arranged in a vertical orientation to provide independent display images that are individually visible from different viewing positions.

In FIG. 4, two users 33 and 34 can view different images by each aligning themselves with a pair of images displayed by the display 31. The display 31 is controlled to provide four display images, left and right eye views for two independent display images. When displayed through the lenticular screen 32, two different images are individually visible from the different viewing positions of the users 33 and 34.

In FIG. 5, a single user 34 can locate himself such that by making only a relatively small movement of his head, he can switch between the two views displayed by the television 30.

The control of the device to provide the correct display image, having regard to the lenticular screens 8 (FIG. 1) and 32 (FIGS. 4 and 5) overlying the displays 12 (FIG. 1) and 31 (FIGS. 4 and 5), respectively, has not been described, as the methods for combining multiple images and the drive schemes for driving the displays 12 and 31 will be known to those skilled in the art. Similarly, the specific design of the lenticular screens 8 and 32 and of the displays 12 and 31 will be known to those skilled in the art.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. An electronic device, comprising:

a display;

an image deflection system overlying said display;
wherein said display is controlled to provide at least two independent display images which, when displayed through said image deflection system, are individually visible from different viewing positions relative to said display;

wherein said display includes a first group of horizontal rows of pixels constituting a first image of said at least two independent display images; and wherein said display includes a second group of horizontal rows of pixels constituting a second image of said at least two independent display images.

2. An electronic device, comprising:

a display;

an image deflection system overlying said display;
wherein said display is controlled to provide at least two independent display images which, when displayed through said image deflection system, are individually visible from different viewing positions relative to said display;

wherein said display includes a first group of vertical rows of pixels constituting a first image of said at least two independent display images; and wherein said display includes a second group of vertical rows of pixels constituting a second image of said at least two independent display images.

3. An electronic device, comprising:

a display controllable to provide a plurality of independent images, said display including a first group of horizontal rows of pixels constituting a first image of the plurality of independent images, and a second group of horizontal rows of pixels constituting a second image of the plurality of independent images; and an image deflection system overlying said display, wherein said image deflection system provides the first image at a first viewing position relative to said display when said display is controlled to provide the first image, and said image deflection system provides the second image at a second viewing position relative to said display when said display is controlled to provide the second image.

4. The electronic device of claim 3, wherein said image deflection system includes a plurality of lenticles, and each lenticle of said plurality of lenticles overlays one horizontal row of pixels of said first group of horizontal rows of pixels and one horizontal row of pixels of said second group of horizontal rows of pixels.

5. The electronic device of claim 3, wherein said display further includes a third group of horizontal rows of pixels constituting a third image of the plurality of independent images, and said image deflection system provides the third image at a third viewing position relative to said display when said display is controlled to provide the third image.

6. The electronic device of claim 5, wherein said image deflection system includes a plurality of lenticles, and each lenticle of said plurality of lenticles overlays one horizontal row of pixels of said first group of horizontal rows of pixels, one horizontal row of pixels of said second group of horizontal rows of pixels, and one horizontal row of pixels of said second group of horizontal rows of pixels.

7. An electronic device, comprising:

a display controllable to provide a plurality of independent images, said display including a first group of vertical rows of pixels constituting a first image of the plurality of independent images, and a second group of vertical rows of pixels constituting a second image of the plurality of independent images; and an image deflection system overlying said display, wherein said image deflection system provides the first image at a first viewing position relative to said display when said display is controlled to provide the first image, and said image deflection system provides the second image at a second viewing position relative to said display when said display is controlled to provide the second image.

8. The electronic device of claim 7, wherein said image deflection system includes a plurality of lenticles, and each lenticle of said plurality of lenticles overlays one vertical row of pixels of said first group of vertical rows of pixels and one vertical row of pixels of said second group of vertical rows of pixels.

9. The electronic device of claim 7, wherein said display further includes a third group of vertical rows of pixels constituting a third image of the plurality of independent images, and said image deflection system provides the third image at a third viewing position relative to said display when said display is controlled to provide the third image.

10. The electronic device of claim 9, wherein said image deflection system includes a plurality of lenticles, and each lenticle of said plurality of lenticles overlays one vertical row of pixels of said first group of vertical rows of pixels, one vertical row of pixels of said second group of vertical rows of pixels, and one vertical row of pixels of said third group of vertical rows of pixels.

* * * * *